(12) United States Patent
Dirrig

(10) Patent No.: US 6,868,934 B2
(45) Date of Patent: Mar. 22, 2005

(54) VARIABLE POWER STEERING ASSIST USING DRIVER GRIP PRESSURE

(75) Inventor: John Ernest Dirrig, Powell, OH (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 21 days.

(21) Appl. No.: 10/616,032

(22) Filed: Jul. 9, 2003

(65) Prior Publication Data
US 2005/0006170 A1 Jan. 13, 2005

(51) Int. Cl.⁷ ............................................... B62D 5/06
(52) U.S. Cl. ................. 180/422; 180/444; 180/446; 701/41
(58) Field of Search .................. 180/422, 444, 180/446; 701/41

(56) References Cited

U.S. PATENT DOCUMENTS

| | | | |
|---|---|---|---|
| 4,476,529 A | 10/1984 | Nakamura et al. | |
| 4,760,892 A * | 8/1988 | Duffy | 180/422 |
| 4,768,604 A | 9/1988 | Schipper | |
| 4,771,841 A * | 9/1988 | Uchida et al. | 180/422 |
| 4,789,041 A | 12/1988 | Takeshima et al. | |
| 4,803,629 A | 2/1989 | Noto et al. | |
| 4,877,099 A | 10/1989 | Duffy | |
| 4,947,951 A | 8/1990 | Miller | |
| 5,086,862 A | 2/1992 | Graber et al. | |
| 5,174,407 A * | 12/1992 | Shimizu et al. | 180/444 |
| 5,392,875 A | 2/1995 | Duffy | |
| 5,508,919 A | 4/1996 | Suzuki et al. | |
| 5,574,641 A | 11/1996 | Kawakami et al. | |
| 5,904,222 A * | 5/1999 | Liubakka et al. | 180/422 |
| 5,925,082 A | 7/1999 | Shimizu et al. | |
| 6,032,755 A | 3/2000 | Blandino et al. | |
| 6,134,490 A | 10/2000 | Ito et al. | |
| 6,173,223 B1 | 1/2001 | Liubakka et al. | |
| 6,219,603 B1 | 4/2001 | Yamamoto et al. | |

\* cited by examiner

*Primary Examiner*—Lesley D. Morris
*Assistant Examiner*—Tony Winner
(74) *Attorney, Agent, or Firm*—Jason H. Foster; Kremblas, Foster, Phillips & Pollick

(57) ABSTRACT

A variable power assist apparatus for vehicles, such as automobiles. The apparatus includes a plurality of sensors, preferably electromechanical transducers, mounted to the hand-grippable region of a steering wheel. The sensors are connected to a computer that controls the power-assist device of the automobile, and produce a signal that is a function of grip pressure. The computer varies the amount of assist provided to the steering system as a function of at least the grip pressure.

7 Claims, 1 Drawing Sheet

VARIABLE POWER STEERING ASSIST USING DRIVER GRIP PRESSURE

BACKGROUND OF THE INVENTION

1. Field of the Invention

This invention relates generally to power steering apparatuses, and more particularly to a power steering apparatus that includes as an input the grip pressure a driver exerts on a steering wheel.

2. Description of the Related Art

It is known to provide a mechanism to assist the driver of a vehicle, in particular an automobile, in the steering of the wheels of the vehicle. Power-assist steering is desirable when the vehicle is moving slowly over a high-friction surface, such as concrete, because the steering wheel of such a vehicle can be especially difficult for a driver to turn under such conditions.

At higher driving speeds and under other conditions, it is desirable to have little or no assist in order to maintain the amount of feedback provided by the steering system to the driver. Thus, variable-assist power steering systems have been developed for providing a relatively high amount of power assist when desired, and for providing a relatively low amount of power assist when desired, such as when driving at highway speeds when the steering wheel is at or near the center position.

Conventional variable-assist power steering systems determine the amount of power assist the system should provide based upon one or more variables, including engine speed, automobile speed and wheel torque, and thereby increase or decrease the amount of assist based upon the values of those variables. Although conventional power-assist systems provide a reasonable balance between the desire for feedback to the driver and power assist to aid in steering, the need exists for a system based upon more complete data to more accurately determine the amount of assist that is desirable under virtually all circumstances.

BRIEF SUMMARY OF THE INVENTION

The invention is a variable-assist power steering apparatus for a vehicle driven by a human over a surface upon which the vehicle rests. The vehicle has a steering wheel that can be gripped by human hands and at least one steerable wheel, preferably a pair of steerable wheels, contacting the surface upon which the vehicle rests. A power assist device is drivingly linked to the steerable wheels and is connected to the steering wheel for assisting the steering of the steerable wheels. The apparatus comprises at least one sensor mounted to the steering wheel. The sensor is for detecting a grip pressure applied to the steering wheel by the human hands of the driver of the vehicle, and producing a signal that is a function of that grip pressure. The apparatus also comprises a computer connected to said at least one sensor and the power assist device. The computer is for controlling the power assist device and varying the amount of assist provided to said at least one steerable wheel as a function of grip pressure.

In a preferred embodiment of the invention, said at least one sensor further comprises a plurality of sensors mounted to a hand-grippable region of the steering wheel and connected to the computer. This permits grip pressure to be measured from multiple locations on the steering wheel, and the signals from the sensors to be transmitted to the computer. In a most preferred embodiment, the sensors are electromechanical transducers. It is contemplated that, in a preferred embodiment, the amount of assist provided to said at least one steerable wheel is varied as a function of grip pressure and at least one other parameter, such as vehicle speed.

Figure 1:
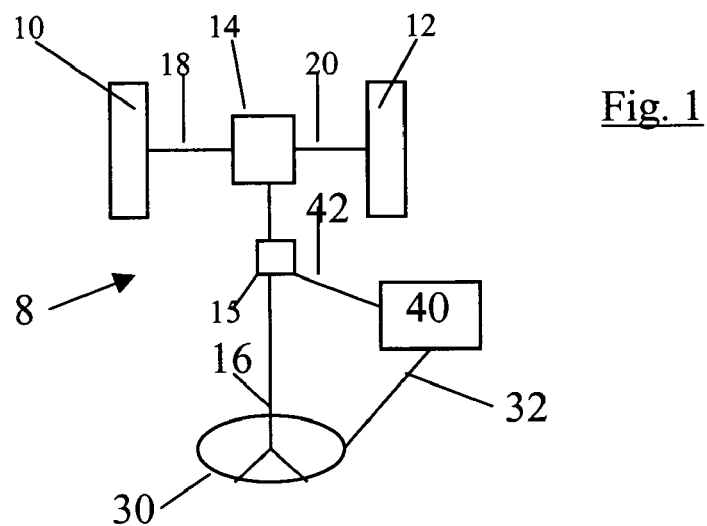
FIG. 1 is a schematic view illustrating an embodiment of the invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or term similar thereto are often used. They are not limited to direct connection, but include connection through other elements where such connection is recognized as being equivalent by those skilled in the art.

DETAILED DESCRIPTION OF THE INVENTION

The preferred embodiment of the present invention is shown in FIG. 1 in schematic form. The steerable wheels 10 and 12 of a vehicle, preferably the front wheels of an automobile 8, are mounted to a gear mechanism 14. The steerable wheels and preferably two other wheels rest upon the ground beneath the vehicle in a conventional manner. In a preferred embodiment, the steerable wheels of the automobile 8 are conventional tires mounted on rims and resting upon pavement.

The gear mechanism 14 is preferably a conventional rack and pinion mechanism or other equivalent apparatus that translates the rotational motion of the steering shaft 16 into longitudinal motion of the steering linkage rods 18 and 20. The steering shaft 16 is rotated when the driver of the vehicle rotates the steering wheel 30, thereby causing the steerable wheels 10 and 12 to turn to one side or the other for steering the automobile 8. The rack and pinion mechanism is conventional for an automobile steering system, although the invention described herein could work with virtually any steering system.

A power assist device 15, such as a hydraulic actuator, is mounted to the steering shaft 16 for moving the steering linkage rods 18 and 20 in relation to driver exerted steering torque on the steering wheel 30. The power assist device 15, which is conventionally known in the automobile art, reduces the amount of effort that is required by a driver to rotate the steering wheel 30 in order to steer the vehicle.

A computer 40 is mounted to the vehicle in a conventional manner to receive inputs and produce signals in accordance with programmed logic. Multiple sensors (shown in FIG. 2) are mounted to the steering wheel 30, and connect, preferably by a wire or alternatively by wireless transmitting devices, to the computer 40. The computer 40 is connected, preferably by a wire or alternatively by wireless transmitting devices, to the power assist device 15 to control the amount of assist provided based upon input signals received by the computer 40 as described below. The connection, including the wire and the wireless alternative, between the computer 40 and the power assist device 15 is illustrated schematically by the line 42 in FIG. 1. The connection, including the wire and the wireless alternative, between the computer 40 and the sensors on the steering wheel 30 is illustrated schematically by the line 32 in FIG. 1.

Figure 2:
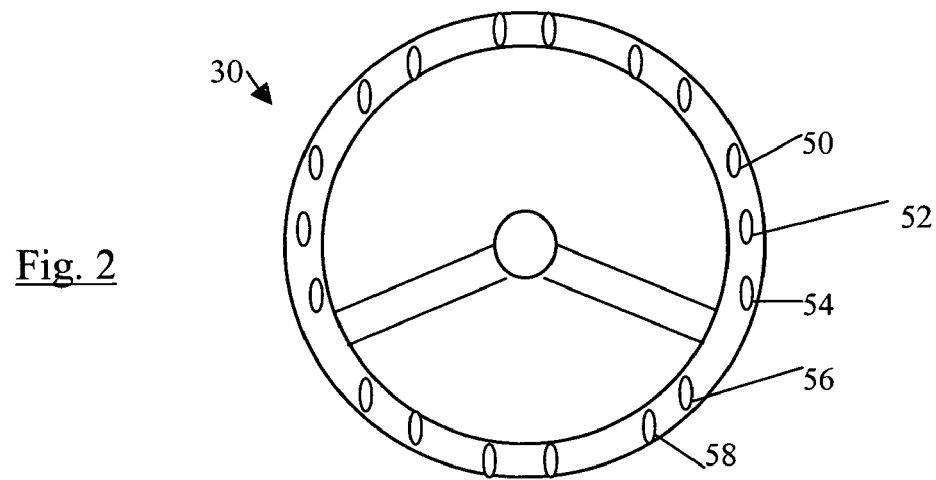
FIG. 2 is a front view illustrating a steering wheel to which a plurality of sensors are mounted.

As shown in FIG. 2, the steering wheel 30 has multiple sensors 50, 52, 54, 56 and 58 mounted to the circular, hand-grippable region of the steering wheel 30. Each of the sensors is preferably mounted within the grippable region of the steering wheel 30, either exposed as shown or hidden beneath a protective or decorative material, such as leather. Thus, a driver who grips the steering wheel in a conventional manner, such as by grasping the circular ring of the steering wheel 30 between his or her palm and fingers, will compress at least one, and preferably multiple, of the sensors, which will in turn produce a signal that is a function of the compressive force applied to the sensor. It is possible to use only one sensor in one discrete location, or a single sensor with multiple regions that can produce distinguishable signals, but it is preferred to have multiple sensors spaced along all of the areas of the steering wheel where human hands can grasp.

Each sensor, which can be an electromechanical transducer, produces a signal, preferably an electrical signal, that is a function of the force exerted on the sensor. The signals from the sensors are communicated to the computer 40 along the connection 32 shown in FIG. 1. The computer 40 receives the signals from the sensors, and, according to an algorithm, calculates the amount of power assist to provide to the driver who is rotating the steering wheel 30 of the automobile 8.

In a preferred embodiment, when the grip pressure is higher, the computer 40 will normally cause more power assist to be produced. This is because higher grip pressure tends to be associated with the need for greater power assistance, such as when a driver is driving the automobile at low speeds. It is also preferred that the signals received from the sensors be one or more of a larger group of parameters that are used to calculate the amount of power assist needed. For example, automobile speed, engine speed, yaw rate and other parameters can all be used in combination with the grip pressure data provided by the present invention to determine the amount of power assist desired. Still further, the duration of the grip pressure, and the amount of the steering wheel over which the grip force is applied can all be parameters used to calculate the amount of power assist.

The sensors described above preferably produce an electrical signal that is a function of a force applied to the sensors, and this force can be proportional to pressure, as is known in the art. However, any means for detecting the grip force could be used, and the large number of possible such devices will be known by the person having ordinary skill in the art. For example, piezoelectric crystals and other conventional electromechanical transducers can measure force and pressure and produce a signal.

The term "steering wheel", as used herein, is intended to include any steering device that a human driver can grip to steer the vehicle, and is not limited to circular steering wheels that are conventional in virtually all automobiles. Thus, the present invention can be used with a handlebar or other non-circular steering device, all of which are included within the term "steering wheel."

While certain preferred embodiments of the present invention have been disclosed in detail, it is to be understood that various modifications may be adopted without departing from the spirit of the invention or scope of the following claims.

What is claimed is:

1. A variable-assist power steering apparatus for a vehicle driven by a human over a surface upon which the vehicle rests, the vehicle having a steering wheel that can be gripped by human hands, at least one steerable wheel contacting the surface upon which the vehicle rests and a power assist device that is drivingly linked to said at least one steerable wheel and connected to the steering wheel for assisting the steering of said at least one wheel, the apparatus comprising:
    a) at least one sensor mounted to the steering wheel for detecting a grip pressure applied to the steering wheel by human hands and producing a signal that is a function of grip pressure; and
    b) a computer connected to said at least one sensor and the power assist device for controlling the power assist device and varying the amount of assist provided to said at least one steerable wheel as a function of grip pressure.

2. The apparatus in accordance with claim 1, wherein said at least one sensor further comprises a plurality of sensors mounted to at least one hand-grippable region of the steering wheel, and wherein the plurality of sensors is connected to the computer.

3. The apparatus in accordance with claim 2, wherein the sensors are electromechanical transducers mounted in the steering wheel.

4. The apparatus in accordance with claim 3, wherein the amount of assist provided to said at least one steerable wheel is varied as a function of grip pressure and at least one other parameter.

5. A variable-assist power steering apparatus for a vehicle driven by a human over a surface upon which the vehicle rests, the vehicle having a steering wheel that can be gripped by human hands, a pair of steerable wheels contacting the surface upon which the vehicle rests and a power assist device that is drivingly linked to the pair of steerable wheels and connected to the steering wheel, the apparatus comprising:
    a) a plurality of sensors mounted to a hand-grippable region of the steering wheel for detecting a grip pressure applied to the steering wheel by human hands and producing a signal that is a function of grip pressure; and
    b) a computer connected to the sensors and the power assist device for controlling the power assist device and varying the amount of assist provided to the pair of wheels as a function of grip pressure.

6. A variable-assist power steering apparatus for a vehicle driven by a human over a surface upon which the vehicle rests, the vehicle having a steering wheel that can be gripped by human hands, at least one steerable wheel contacting the surface upon which the vehicle rests and a power assist device that is drivingly linked to said at least one steerable wheel and connected to the steering wheel for assisting the steering of said at least one wheel, the apparatus comprising:
    a) means mounted to the steering wheel for detecting a grip pressure applied to the steering wheel by human hands and producing a signal that is a function of grip pressure; and
    b) a computer connected to said means and the power assist device for controlling the power assist device and varying the amount of assist provided to said at least one steerable wheel as a function of grip pressure.

7. A variable-assist power steering apparatus for a vehicle driven by a human over a surface upon which the vehicle rests, the vehicle having a steering wheel that is gripped by human hands, at least one steerable wheel contacting the surface upon which the vehicle rests and a power assist device that is drivingly linked to said at least one steerable wheel and connected to the steering wheel and is thereby assisting the steering of said at least one wheel, the apparatus comprising:

a) at least one sensor mounted to the steering wheel, the sensor detecting a grip pressure applied to the steering wheel by human hands and producing a signal that is a function of grip pressure; and b) a computer connected to said at least one sensor and the power assist device, the computer controlling the power assist device and varying the amount of assist provided to said at least one steerable wheel as a function of grip pressure.

* * * * *